US012226952B2

(12) United States Patent
Zavoyskikh

(10) Patent No.: US 12,226,952 B2
(45) Date of Patent: Feb. 18, 2025

(54) ADDITIVE MANUFACTURING APPARATUS, SYSTEM AND METHOD

(71) Applicant: Anton Zavoyskikh, Wenatchee, WA (US)

(72) Inventor: Anton Zavoyskikh, Wenatchee, WA (US)

(73) Assignee: Anton Zavoyskikh, Wenatchee, WA (US)

( * ) Notice: Subject to any disclaimer, the term of this patent is extended or adjusted under 35 U.S.C. 154(b) by 0 days.

(21) Appl. No.: 17/941,224

(22) Filed: Sep. 9, 2022

(65) Prior Publication Data

US 2023/0018656 A1 Jan. 19, 2023

Related U.S. Application Data

(62) Division of application No. 17/099,628, filed on Nov. 16, 2020, now Pat. No. 11,485,080.

(51) Int. Cl.
*B29C 64/364* (2017.01)
*B29C 41/04* (2006.01)
(Continued)

(52) U.S. Cl.
CPC .......... *B29C 64/129* (2017.08); *B29C 41/045* (2013.01); *B29C 64/209* (2017.08);
(Continued)

(58) Field of Classification Search
CPC .... B29C 64/124; B29C 64/129; B29C 64/135
See application file for complete search history.

(56) References Cited

U.S. PATENT DOCUMENTS

| 5,545,367 A * | 8/1996 | Bae | B33Y 30/00 |
| | | | 427/595 |
| 5,609,814 A * | 3/1997 | Takano | B29C 64/135 |
| | | | 427/512 |

(Continued)

FOREIGN PATENT DOCUMENTS

| CN | 111086207 B * | 5/2022 | ............. B28B 1/001 |
| JP | S61154815 A * | 7/1986 | ........... B29C 64/129 |

(Continued)

*Primary Examiner* — Atul P. Khare
(74) *Attorney, Agent, or Firm* — Buchalter

(57) ABSTRACT

A system and method for providing centrifuge-based additive object manufacturing includes a rotating drum containing a photopolymer material that solidifies when irradiated by a light source, the photopolymer material spreads evenly over an item being manufactured when the rotating drum is in motion, a light source module emitting a light capable of solidifying the photopolymer material, a set of platform actuator elements coupled to a plurality of perforated platforms for controlling a position of the plurality of perforated platforms within the rotating drum while in operation, and a photopolymer material delivery system for adding a controlled amount of the photopolymer material into the rotating drum. The light source module moves inside the rotating drum and selectively emits its light solidifying the part of the layer above the plurality of perforated platforms in the areas crossing the object currently being manufactured.

8 Claims, 14 Drawing Sheets

(51) Int. Cl.
*B29C 64/129* (2017.01)
*B29C 64/209* (2017.01)
*B29C 64/241* (2017.01)
*B29C 64/245* (2017.01)
*B29C 64/25* (2017.01)
*B29C 64/264* (2017.01)
*B29C 64/30* (2017.01)
*B29C 64/343* (2017.01)
*B33Y 40/00* (2020.01)
*B29C 41/22* (2006.01)
*B33Y 10/00* (2015.01)
*B33Y 30/00* (2015.01)
*B33Y 80/00* (2015.01)

(52) U.S. Cl.
CPC .......... *B29C 64/241* (2017.08); *B29C 64/245* (2017.08); *B29C 64/25* (2017.08); *B29C 64/264* (2017.08); *B29C 64/30* (2017.08); *B29C 64/343* (2017.08); *B29C 64/364* (2017.08); *B33Y 40/00* (2014.12); *B29C 41/22* (2013.01); *B33Y 10/00* (2014.12); *B33Y 30/00* (2014.12)

(56) References Cited

U.S. PATENT DOCUMENTS

| | | | |
|---|---|---|---|
| 6,537,052 B1 * | 3/2003 | Adler | B29C 64/135 264/401 |
| 6,607,689 B1 * | 8/2003 | Farnworth | B33Y 40/20 425/375 |
| 11,117,314 B2 * | 9/2021 | Nelson | B29C 64/232 |
| 2016/0200044 A1 * | 7/2016 | Voit | B29C 64/20 264/401 |
| 2020/0086567 A1 | 3/2020 | Salem et al. | |
| 2020/0156290 A1 | 5/2020 | Corsmeier | |
| 2020/0180224 A1 | 6/2020 | Budge | |
| 2021/0122104 A1 * | 4/2021 | Holt | B29C 64/321 |

FOREIGN PATENT DOCUMENTS

| | | | | |
|---|---|---|---|---|
| JP | 01031625 A | * | 2/1989 | ......... B29C 67/0066 |
| JP | 02103128 A | * | 4/1990 | ......... B29C 67/0066 |
| WO | WO-9006540 A | * | 6/1990 | ............ B01J 19/121 |
| WO | 2019133553 | | 7/2019 | |

* cited by examiner

Still Position
Drum is in locked position, material at the bottom of drum
Light source module is outside drum

Initial Position
Drum rotates at high RPM, centrifugal force moves material to the drum walls.

Final Position
Drum rotates at high RPM, centrifugal force moves material to the drum walls. Platform in final position

Still Position
Drum is in locked position, Light source and material delivery modules are outside drum

Initial Position
Drum rotates at high RPM, MDM sprays material on the drum wall, centrifugal force spread material evenly

Final Position
Drum rotates at high RPM, centrifugal force moves material to the drum walls and built part surface. MDM and LSM move as part grows.

Initial Position
Drum rotates at high RPM, MDM sprays material on the drum wall, centrifugal force spread material evenly

Final Position
Drum rotates at high RPM, centrifugal force moves material thru nozzles into volume between drum walls.

ature, etc. Technique (b) often causes process failures and thus destruction of the objects forming due to separation forces. Even utilizing the so-called "dead zone" is prone to failures due to vacuum forces created during the process of delivering material for the next layer. Technique (c) requires a uniform distribution of a newly formed layer over the previous one, which is not an easy task.

ADDITIVE MANUFACTURING APPARATUS, SYSTEM AND METHOD

REFERENCE TO RELATED APPLICATION

The present application is a divisional application of U.S. patent application Ser. No. 17/099,628, filed Nov. 16, 2020, currently pending, whose disclosure is hereby incorporated by reference in its entirety into the present application.

TECHNICAL FIELD

This application relates in general to a system and method for providing 3D object manufacturing, and more specifically, to a system and method for providing centrifuge-based additive object manufacturing.

BACKGROUND

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin through a transparent membrane, or (c) continually polymerizing layers of resin that have been jetted downward by one or more single-nozzle or multi-nozzle print heads.

Technique (a) requires maintaining tight control over the material level and leading to part inaccuracies due to a meniscus forming, voids during material application, etc. Technique (b) often causes process failures and thus destruction of the objects forming due to separation forces. Even utilizing the so-called "dead zone" is prone to failures due to vacuum forces created during the process of delivering material for the next layer. Technique (c) requires a uniform distribution of a newly formed layer over the previous one, which is not an easy task.

Therefore, a need exists for a system and method for providing centrifuge-based additive object manufacturing. The present invention attempts to address the limitations and deficiencies of prior solutions utilizing the principles and example embodiments as disclosed herein.

SUMMARY

In accordance with the present invention, the above and other problems are solved by providing a system and method for providing centrifuge-based additive object manufacturing according to the principles and example embodiments disclosed herein.

In one embodiment, the present invention is a system for providing centrifuge-based additive object manufacturing. The system providing centrifuge-based additive object manufacturing includes a rotating drum containing a photopolymer material that solidifies when irradiated by a light source, the photopolymer material spreads evenly over an item being manufactured when the rotating drum is in motion, a light source module emitting a light capable of solidifying the photopolymer material, a set of platform actuator elements coupled to a plurality of perforated platforms for controlling a position of the plurality of perforated platforms within the rotating drum while in operation, and a photopolymer material delivery system for adding a controlled amount of the photopolymer material into the rotating drum. The light source module moves inside the rotating drum and selectively emits its light solidifying the part of the layer above the plurality of perforated platforms in the areas crossing the object currently being manufactured.

In another aspect of the present invention, the photopolymer material delivery system adds additional photopolymer material to the rotating drum after the light source module solidifies a new layer onto the item being manufactured before the light source module activates to solidify a next layer.

In another aspect of the present invention, air pressure within the rotating drum is raised above surrounding atmospheric air pressure while the rotating drum is in operation.

In another aspect of the present invention, centrifugal force exerted onto the photopolymer material within the rotating drum is raised above surrounding gravity while the rotating drum is in operation.

In another aspect of the present invention, the photopolymer material delivery system comprises a material delivery module inserted within the rotating drum on an opposing side from the light source module.

In another aspect of the present invention, the photopolymer material delivery system comprises a set of material delivery nozzles located on a bottom surface within the rotating drum on an opposing side from the light source module.

In another embodiment of the present invention is a system for providing pressure-based additive object manufacturing. The system includes a pressure vessel containing a photopolymer material that solidifies when irradiated by a light source, the photopolymer material spreads evenly over an item being manufactured when the rotating drum is in motion, the pressure vessel having a transparent top surface, a light source module emitting a light capable of solidifying a top layer of the photopolymer material through the transparent top surface of the pressure vessel, a platform actuator coupled to a movable platform for controlling a vertical position of the movable platform within the pressure vessel while in operation, the platform actuator moves to position a current top surface the item being manufactured a single layer below a current level of the photopolymer material, and a photopolymer material delivery system for adding a controlled amount of the photopolymer material into the pressure vessel. The light source module selectively emits its light solidifying the single layer below a current level of the photopolymer material above the object currently being manufactured.

In another aspect of the present invention, the light source module emits a different light pattern for each layer of the item being manufactured to solidify the photopolymer material according to the different light pattern.

In another aspect of the present invention, the system further comprises a photopolymer material delivery system for adding a controlled amount of the photopolymer material into the pressure vessel.

In another embodiment, the present invention is a method for providing centrifuge-based additive object manufacturing. The method rotates a drum having set of platform actuator elements coupled to a plurality of perforated platforms for controlling a position of the plurality of perforated platforms within the rotating drum, inserts a controlled amount of photopolymer material into the rotating drum, selectively solidifies a layer of the photopolymer material onto an item being manufactured using a light source module emitting its light onto the layer of the photopolymer material, and adjusting a position of the light source module to a new position to solidify a next layer of the photopolymer material.

In another aspect of the present invention, the method further comprises adding additional photopolymer material to the rotating drum before solidifying the next layer.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1A:
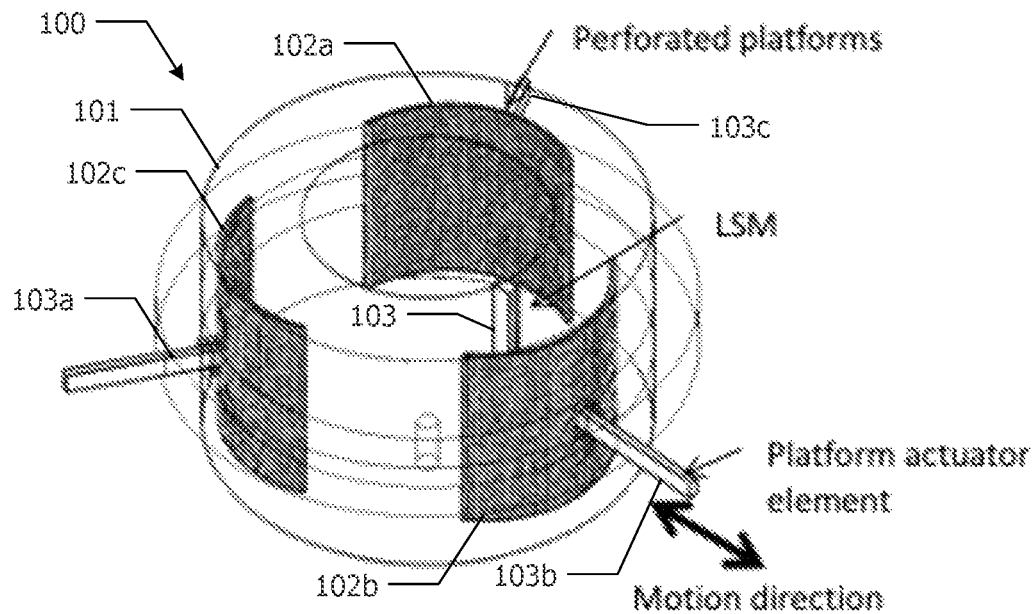
FIGS. 1a-e illustrate a first embodiment for a system that provides centrifuge-based additive object manufacturing according to the present invention.

This application relates in general to a system and method for providing 3D object manufacturing, and more specifically, to a system and method for providing centrifuge-based additive object manufacturing according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "worker" and "user" refer to an entity, e.g. a human, using the centrifuge-based additive object manufacturing system including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), and ethernet cable(s) or wireless connection(s) using any type of frequency/frequencies or radio wave(s). Some examples are included below in this application.

The term "invention" or "present invention" refers to the invention being applied for via the patent application with the title "A Centrifuge-based Additive Object Manufacturing Apparatus, System and Method." Invention may be used interchangeably with device.

In general, the present disclosure relates a system and method for providing 3D object manufacturing. To better understand the present invention, FIGS. 1a-d illustrate a first embodiment for a system that provides centrifuge-based additive object manufacturing according to the present invention. An apparatus for producing a three-dimensional object(s) shown in FIGS. 1a-d includes at least one of: a drum capable of rotating around its axis, a material delivery system, an electromagnetic wave source (light, IR or UV), and a build platform. This apparatus' 3D object manufacturing system 100 utilizes a method of applying a new layer of material, such as a photopolymer, a powder or any other type of material that is changing phase or solidifying under irradiation. This apparatus 100 resolves known problems with existing methods of a material applications using vacuum or capillary blade, drums, curtain coating, membranes, and the like.

FIG. 1a shows a rotating drum 101 having a plurality of perforated platforms 102a-c positioned within the rotating drum 101, a light source module 103, and a set of platform actuator elements 104a-c coupled to a plurality of perforated platforms 102a-c that control the position of the plurality of perforated platforms 102a-c within the rotating drum 101 while in operation.

At the beginning the perforated platform is oriented in its most advanced position. The plurality of perforated platforms 102a-c could be solid platforms in place of perforated ones. The rotating drum 101 is initially filled with a given amount of material 105. The light source module 103 is positioned outside the rotating drum 101.

When the rotating drum 101 starts spinning, the material 105 within the rotating drum 101 spreads evenly over the plurality of perforated platforms 102a-c in a single layer thickness. The light source module 103 moves inside the rotating drum 101 and starts selectively emitting its light, thus solidifying the part of the layer above the plurality of perforated platforms 102a-c in the areas crossing the object currently being manufactured. Once complete, the plurality of perforated platforms 102a-c are moved one layer outward causing the material 105 to spread evenly over the newly formed section and the process repeats.

Figure 1B:
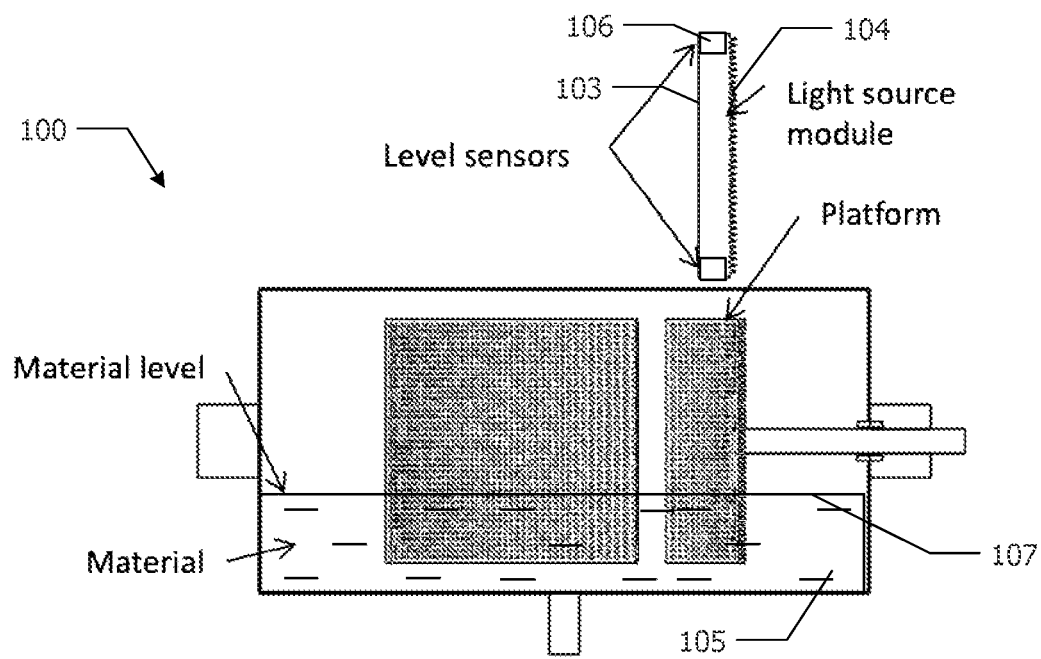

FIG. 1b shows the rotating drum 101 at an initial position while at rest. The rotating drum 101 is locked into a fixed position and material 105 is added to the rotating drum 101. The added material 105 fills the rotating drum 101 to the material level 107. The light source module 103 includes a set of level sensors 106 to provide material 105 measurements when the light source module 103 is in the rotating drum 101.

Figure 1C:
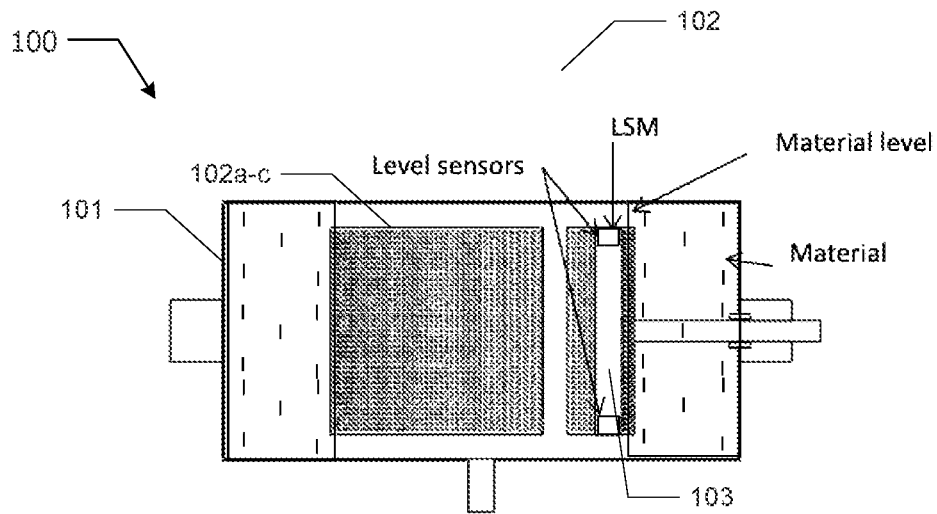

FIG. 1c shows the rotating drum 101 and the material 105 when the rotating drum 101 is rotating at a high RPM and the material 105 has been evenly spread about the plurality of perforated platforms 102a-c. The light source module 103 is lowered into the rotating drum 101 and the level sensors 106 provide measurements of the material level 107. FIG. 1c shows the condition of the apparatus 100 before the light source module 103 irradiates any of the material 105. The light source module 103 then selectively irradiates the material 105 while the rotating drum 101 spins and the process repeats until the part 109 is built.

Figure 1D:
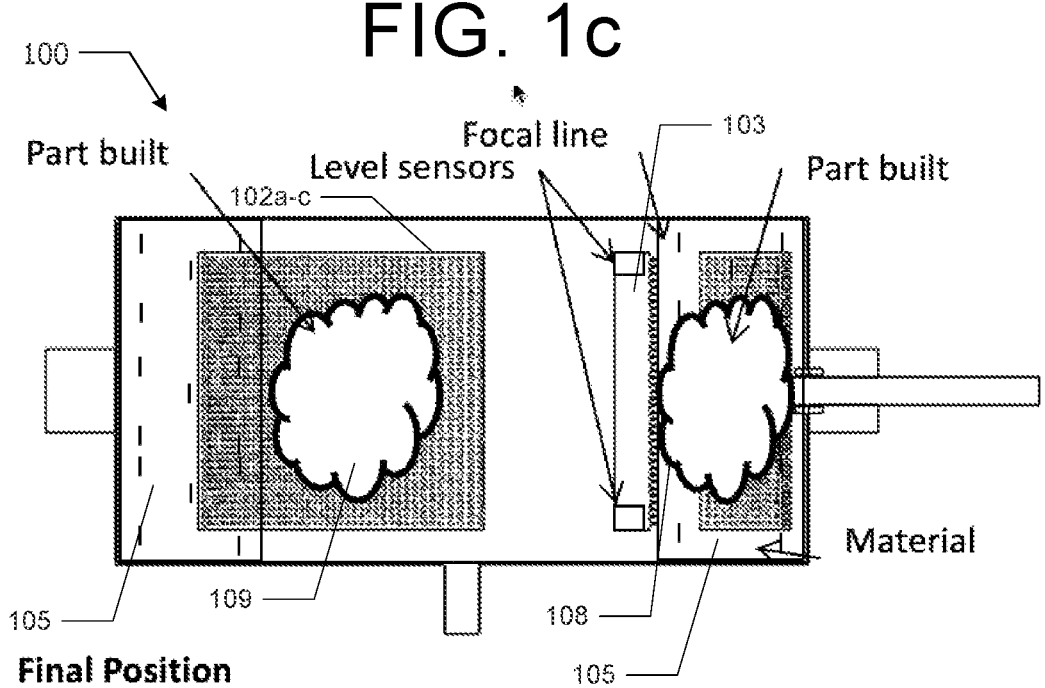

FIG. 1d shows the part built 109 within the rotating drum 101 as it is positioned in front of the plurality of perforated platforms 102a-c. Once the part built 109 reaches its final configuration, the light source module 103 may be removed from within the rotating drum 101, the rotating drum 101 may stop spinning, and the part built 109 may be removed for cleaning and final processing.

In the above examples of the first embodiment, the light source module 103 is made of multiple emitters, primarily solid state lasers; although a single emitter may also be used. Accuracy of each emitter to illuminate a particular location on the part built 109 while the rotating drum 101 is in motion may be controlled by switching each emitter on/off while the particular emitter is directed at a desired location on the part built 109. The location on the part built 109 may be determine in a vertical axis from the position of a particular emitter in the array of light source module 103 and the known depth of the light source module when it is lowered into the rotating drim 101. The horizontal resolution of the location in which the emitter is directed may be determined using a ratio between the vertical speed of the laser vs RPM of the drum determines the vertical resolution.

A close analogue to the operation of the light source module 103 as the emitters solidifies material 105 onto a part built would be a lathe cutting the thread on the cylinder. With the same advance speed, A higher RPM of the lathe results in a tighter the neighboring threads. In case of plural emitters, each of them is covering its own portion of the model in vertical direction. Everything should be synchronized. Amount of material delivered per second (or the platform speed in case of moving platform) determines the speed of the printing in the inward direction, RPM of the drum combined with the speed of the emitters controls resolution in up/down direction ("threads" per mm) and the modulating frequency of each emitter determines horizontal resolution.

Figure 1E:
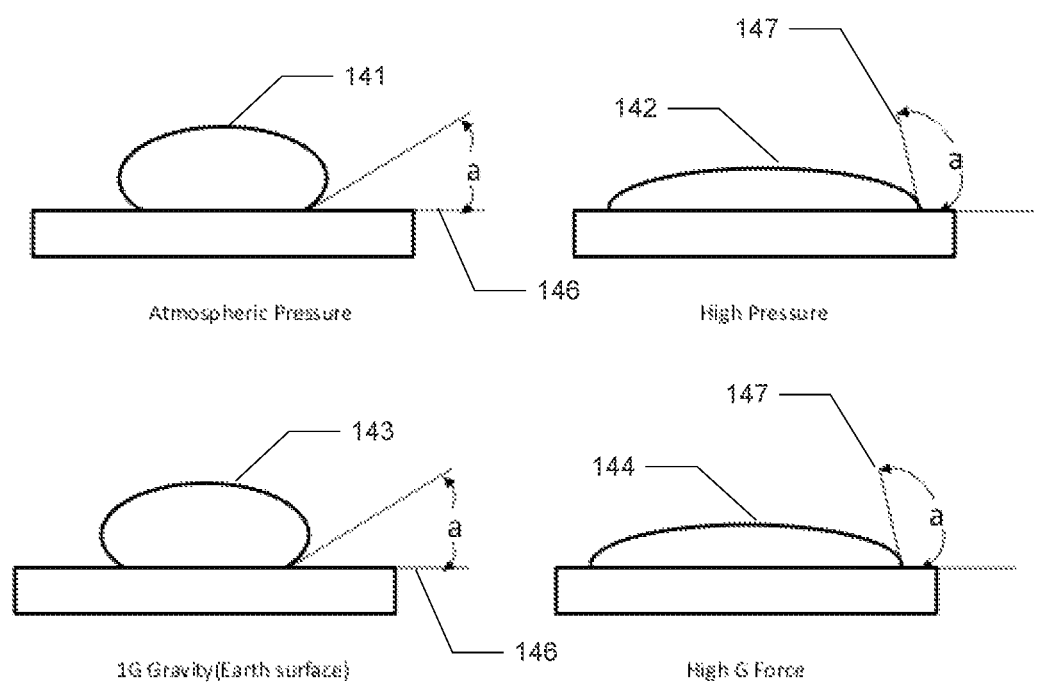

FIG. 1e shows various effects of pressure involved in depositing material evenly for manufacture. One of the biggest problem in additive 3D printing is a deposition of thin even layers of material, such as powder, photometer, solutions etc., prior to the selective solidification as described above. Spreading material with any kind of mechanical spreaders such as blade, roller depositor, coating etc. causing problems such us meniscus, voids in the part area, dangerous hills and other local thickness deviations.

The present invention utilizes a pair of innovative material deposition principles. Both of these principles allow the material to be uniformly deposited onto an object as it is manufactured without mechanical contact with the part forming area. High pressure 142 as compared to atmospheric pressure 141 or high gravity forces 144 as compared to Earth's 1G gravity are responsible for material to be delivered an evenly distributed over newly formed layer forming even layer of material of the given thickness. FIG. 1e illustrates effect of the high pressure 142 and high gravity forces 144 shown to increase the contact angle(s) 146-147 and overcome low wetting and surface tension found in most depositing processes. These principles are included within the present invention as disclosed below in reference to FIG. 6a-b.

Figure 2:
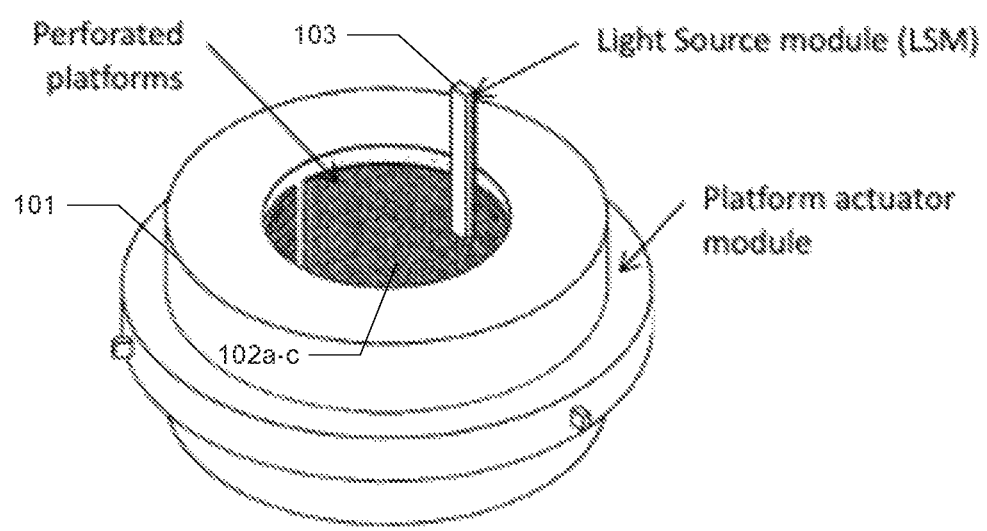
FIG. 2 illustrates components within the first embodiment for a system that provides centrifuge-based additive object manufacturing according to the present invention.

FIG. 2 illustrates components within the first embodiment of a system that provides centrifuge-based additive object manufacturing according to the present invention. The use of a centrifuge 100 uses a higher level of gravitational force from the rotating motion of the centrifuge 100 utilizes to force the layer of added material to spread evenly across the object being fabricated as the chamber and materials spins.

Figure 3A:
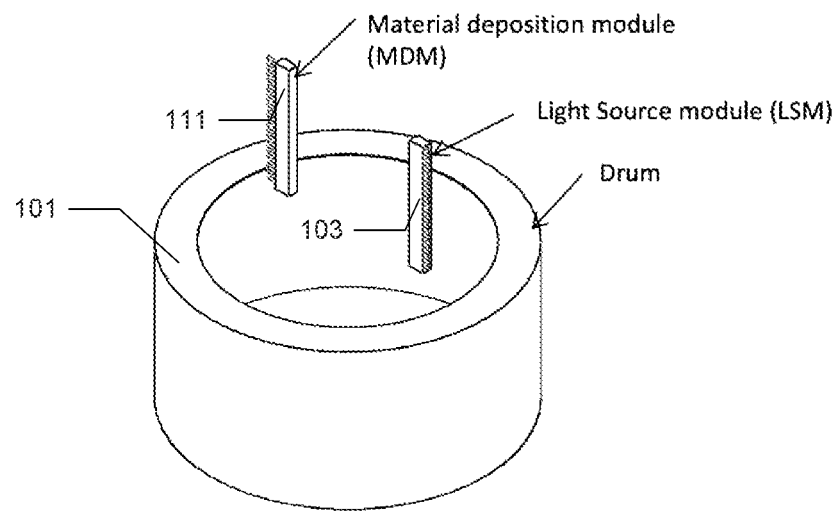
FIGS. 3a-d illustrate a second embodiment for a system that provides centrifuge-based additive object manufacturing according to the present invention.
Figure 3B:
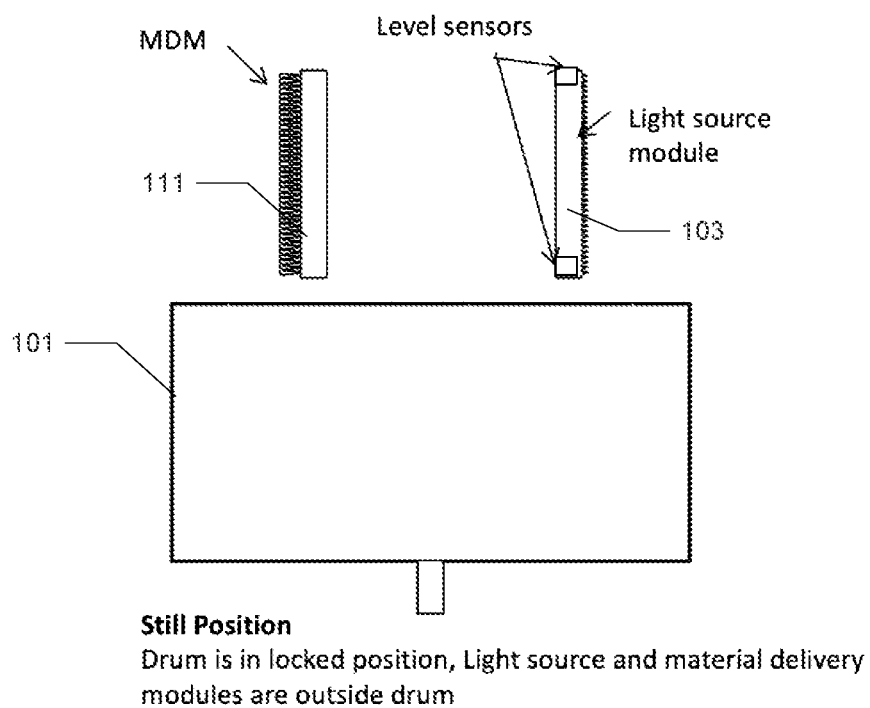
Figure 3C:
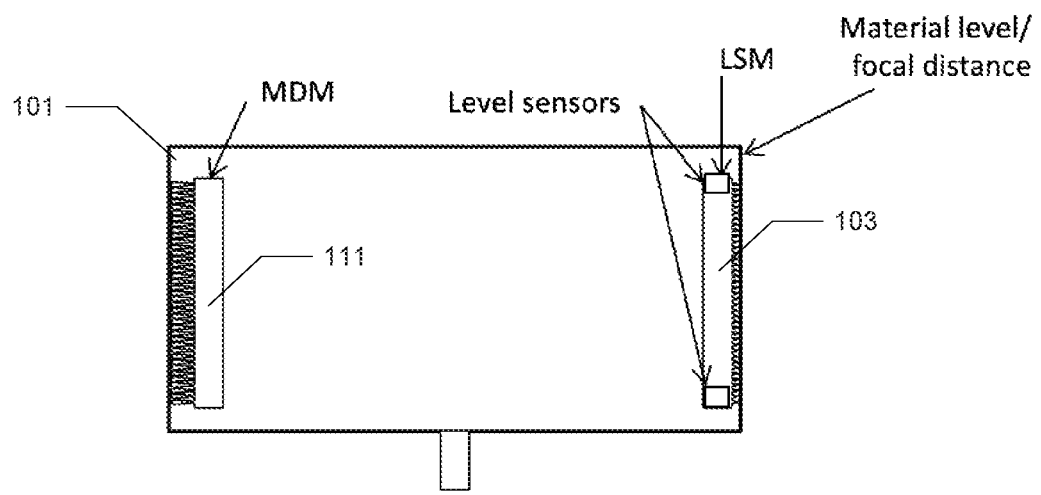

FIGS. 3a-d illustrate a second embodiment of a system that provides centrifuge-based additive object manufacturing according to the present invention. FIG. 3a shows the rotating drum 101, the light source module 103, and a material depositation module 111 that work together in this embodiment. The rotating drum 101 initially is empty and the light source module 103 is outside the rotating drum 101 in a still position of FIG. 3b. The material deposition module 111 (MDM) is lowered inside the rotating drum 101 in the initial position of FIG. 3c until it is almost touching the inner surface of the rotating drum 101.

Figure 3D:
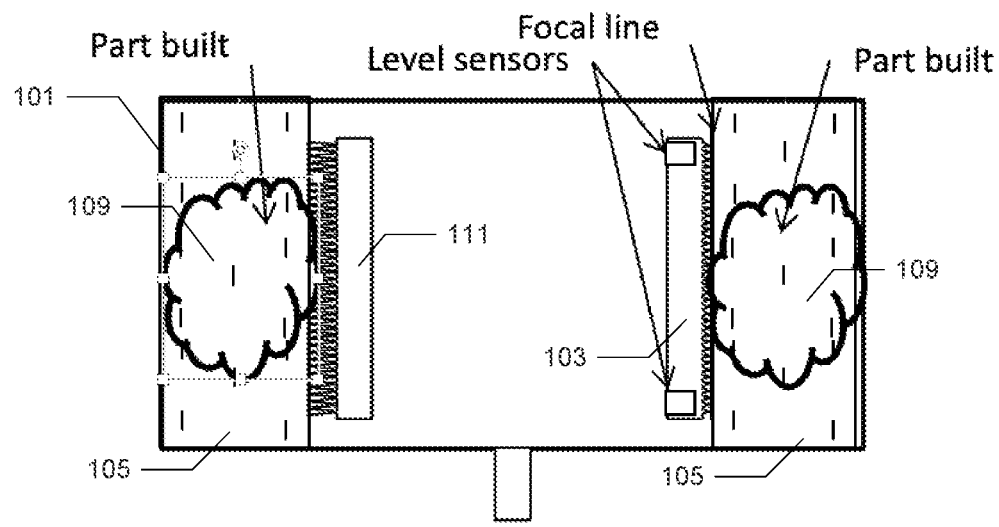

When the rotating drum 101 starts spinning at full speed as seen in FIG. 3d, the material deposition module 111 starts depositing material 105. Due to centrifugal forces, material 105 spreads evenly covering a plurality of perforated platforms 102a-c by a single layer thickness, then depositation stops.

The light source module 103 moves downward inside the rotating drum 101 and then horizontally toward the inner surface of the rotating drum rotating drum 101. The light source module 103 stops on a focal line 108 from the newly formed layer of material 105. The light source module 103 starts selectively emitting, solidifying the part of the layer above the plurality of perforated platforms 102a-c in the areas crossing the object currently being manufactured.

The light source module 103 and material deposition module 111 are moving one layer inward, the material deposition module 111 deposits enough material to create a new layer of material 105 over the newly formed section and the process repeats until the part 109 is complete. The focal lines 108 and the level sensors 106 operate in this embodiment.

Figure 4A:
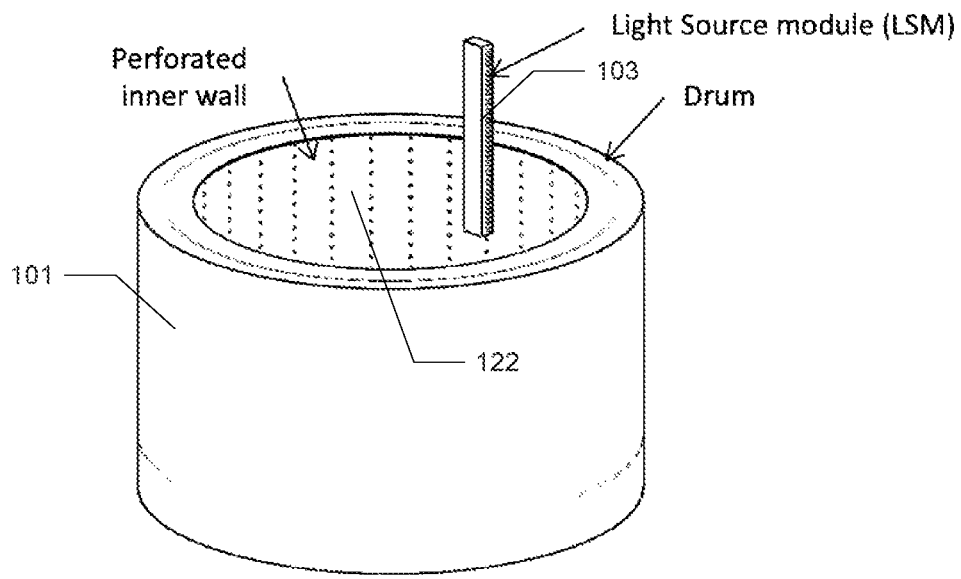
FIGS. 4a-d illustrate a third embodiment for a system that provides centrifuge-based additive object manufacturing according to the present invention.

FIGS. 4a-d illustrate a third embodiment for a system that provides centrifuge-based additive object manufacturing according to the present invention. In this embodiment, the rotating drum 101 is initially empty as shown in FIG. 4a. The material supply compartment 121 contains enough material 105 to complete the build.

Figure 4B:
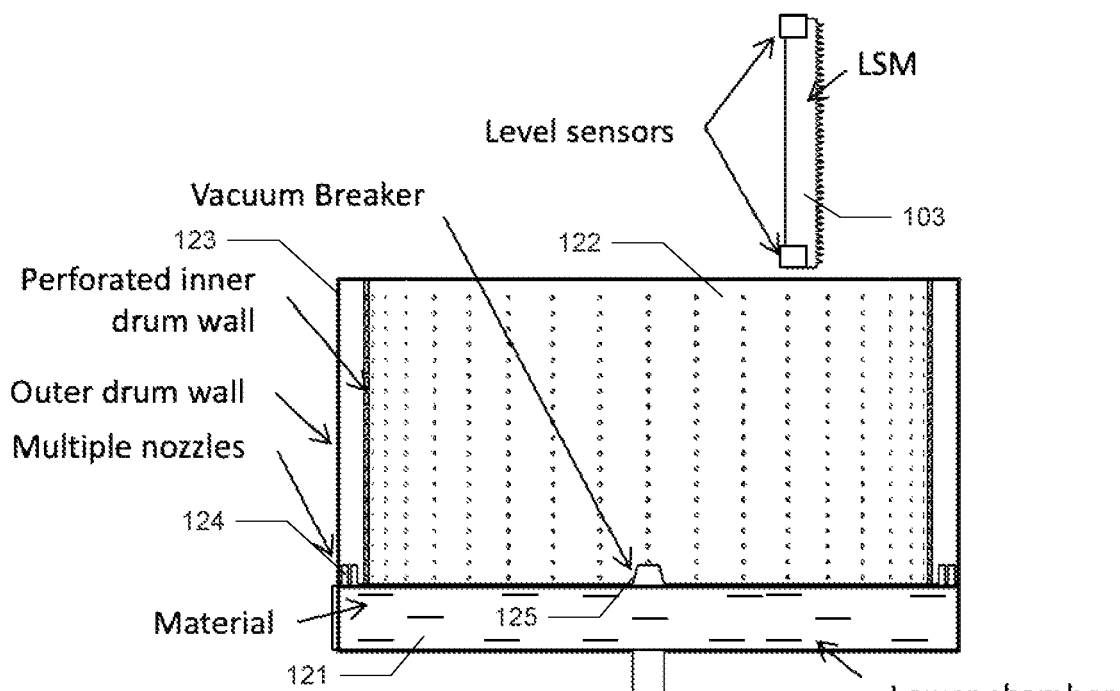
Figure 4C:
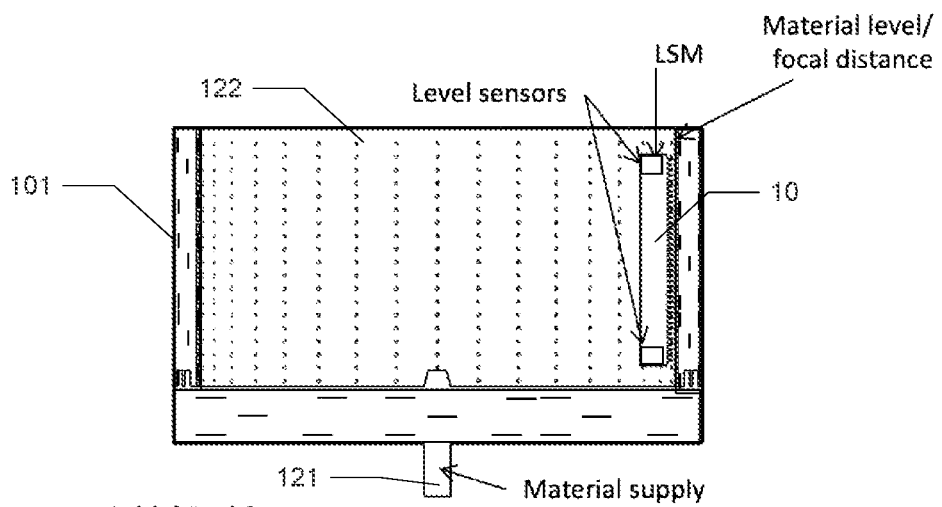
Figure 4D:
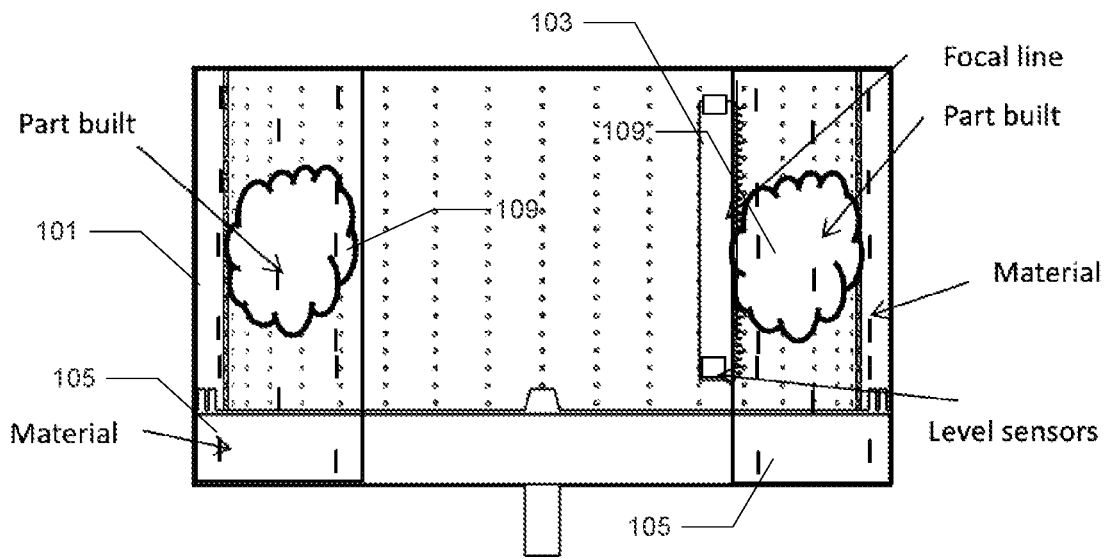

The light source module 103 begins outside the rotating drum 101 as shown in FIG. 4b. The rotating drum 101 starts spinning in FIG. 4c and a portion of the material 105 is forced by centrifugal forces to the supply compartment 121, pushed through the multiple nozzles 124 into the rotating drum 101 and evenly covering the perforated inner wall 122 of the rotating drum 101 in a single layer thickness.

The light source module 103 moves downward inside the 101 and then horizontally toward the perforated inner wall 122 of the rotating drum 101 stopping on the focal distance focal lines 108 from the newly formed layer. The light source module 103 starts selectively emitting, solidifying the part of the layer above the plurality of perforated platforms 102a-c in the areas crossing the object currently being manufactured.

The light source module 103 moves one layer inward; multiple nozzles 124 open to deposit enough material 105 to create a new layer over a newly formed section and the process repeats. The light source module 103 of the third embodiment is the same as in the previous embodiments disclosed above. The difference between these embodiments us found in the way material 105 is being supplied. The material 105 is either coming from the bottom compartment through the nozzles or being supplied to the bottom of the drum during the build and then high g-forces move material upwards to the part forming area.

FIGS. 5a-d illustrate a fourth embodiment of a system that provides centrifuge-based additive object manufacturing according to the present invention. The rotating drum 101 is initially empty and the material supply compartment 121 is empty in the initial state of FIG. 5a. The light source module 103 is outside the rotating drum 101.

Figure 5A:
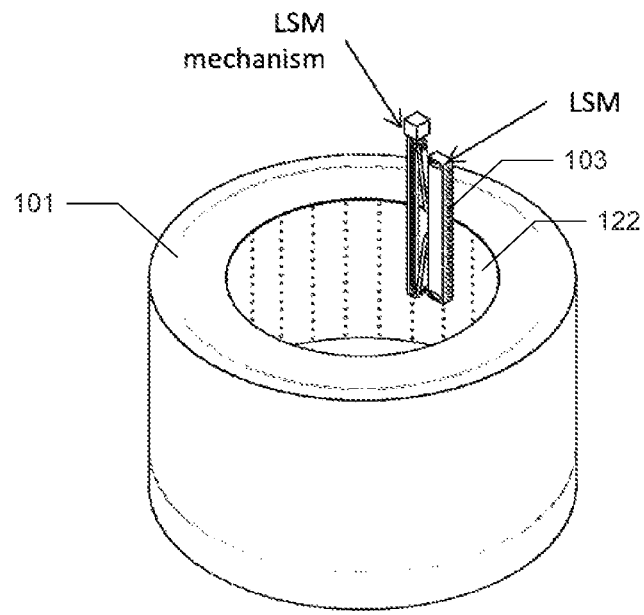
FIGS. 5a-d illustrate a fourth embodiment for a system that provides centrifuge-based additive object manufacturing according to the present invention.
Figure 5B:
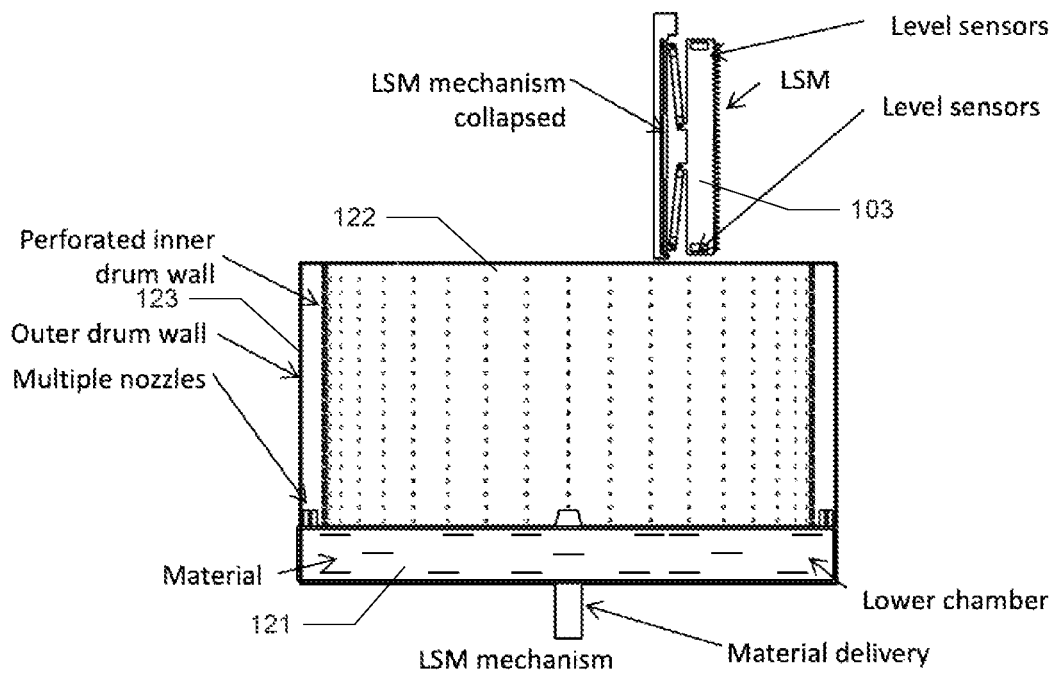
Figure 5C:
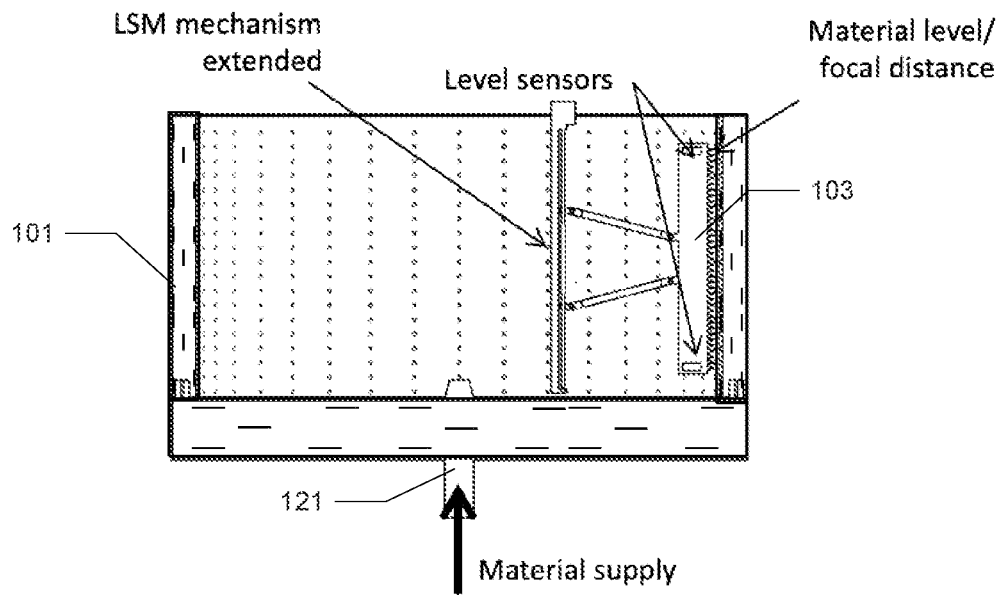
Figure 5D:
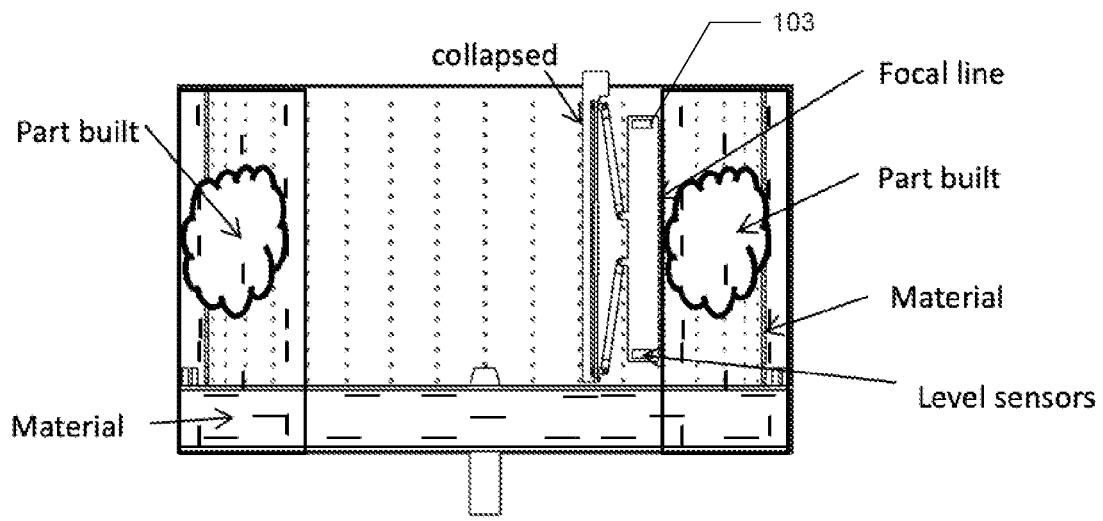

The rotating drum 101 starts spinning as shown in FIG. 5c. An amount of material needed to create just one layer is deposited into the supply compartment 121. Due to centrifugal forces, a portion of the material 105 from the supply compartment 122 is pushed through the nozzles 124 into the 101 and spreads evenly over a perforated inner wall 122 of the rotating drum 101 by a single layer thickness.

The light source module 103 moves downward inside the rotating drum 101 and then horizontally toward the perforated inner wall 122, 101 stopping on the focal distance 108 lines of the newly formed layer. The light source module 103 starts selectively emitting, solidifying the part of the layer above the platform in the areas crossing the object currently being manufactured.

The light source module 103 moves one layer inward, a new portion of material is pumped into the supply compartment 122 and then into 101 the drum; enough material is provided to create a new layer over the newly formed section of the part built 109 as the multiple nozzles 124 stay open all the time and the process repeats.

Figure 6A:
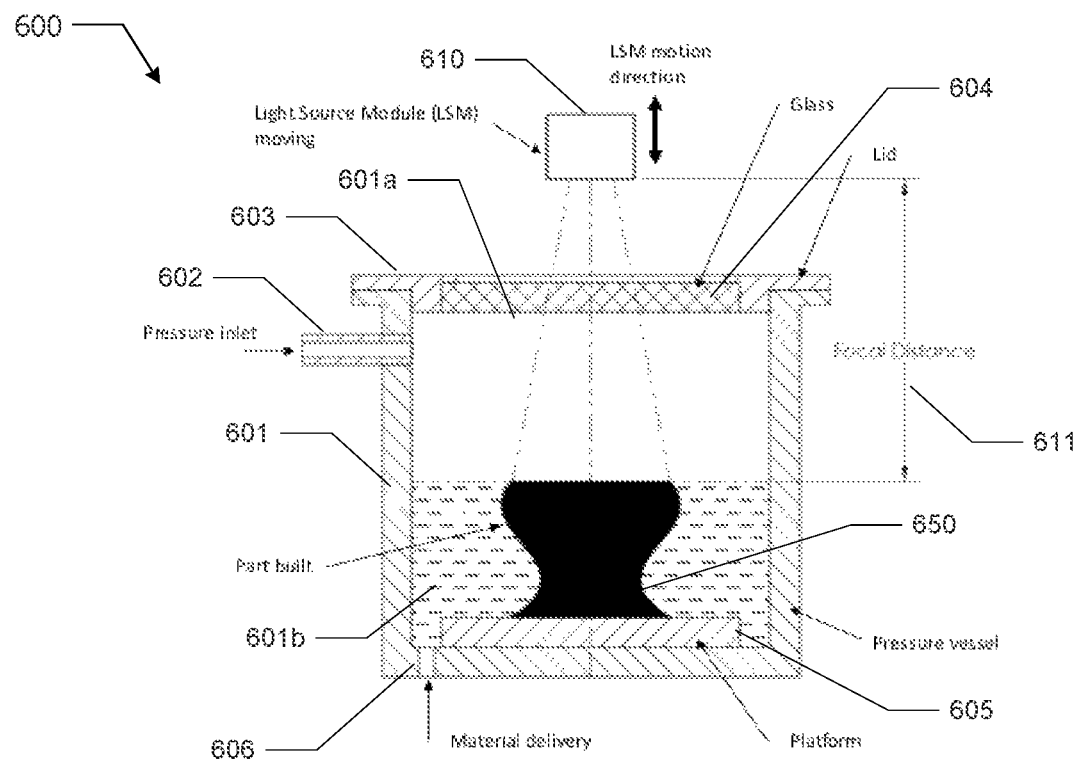
FIGS. 6a-b illustrate a pair of embodiments for a system that provides pressure chamber-based additive object manufacturing according to the present invention.
Figure 6B:
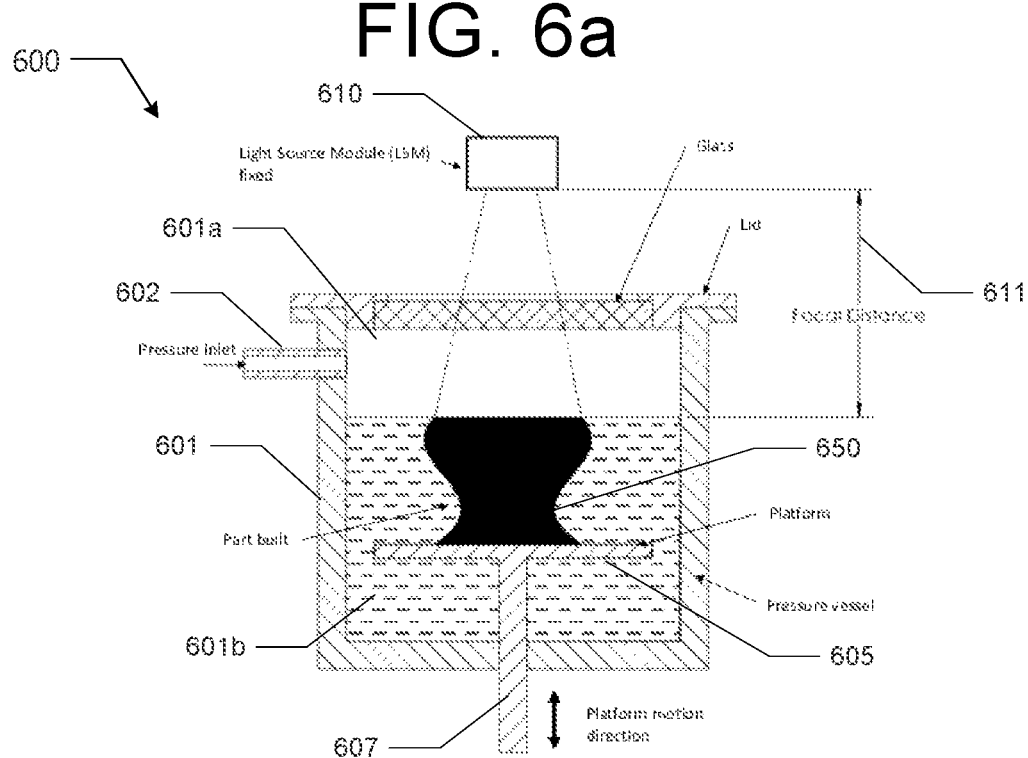

FIGS. 6a-b illustrate a pair of embodiments for a system that provides pressure chamber-based additive object manufacturing according to the present invention. FIG. 6a shows a first embodiment of a pressure-based material delivery and fabrication system according to the present invention. A pressure vessel 601 is utilized to form a 3D model 650 within the vessel 601.

The pressure vessel 601 includes a sealed lid 603 containing a transparent glass insert 604 to create an internal pressure chamber 601a in which a 3D model is being formed. The upper portion of the chamber 601a is pressurized using a pressure inlet 604 located near the lid 603. Material 601b used to create the 3D model enters the pressure chamber 601a from a delivery port 606 located on the bottom of the pressure vessel 601. Pressure within the upper portion of the pressure chamber 601a forces the material 601b to remain in a lower portion of the pressure chamber 601a.

A light source module (LSM) 610 is positioned above the transparent surface 604 in the lid 603 in which the LSM 610 focuses a light pattern at a focal distance 611 from the top of the material 601b. As with other embodiments, the LSM 610 solidifies the material 601b at particular locations on the top surface of the material 601b Using a mask to the light source within the LSM 610, the material 601b may be solidified at specific locations along the top of the material 601b. The LSM 610 may move up and down as needed to alter the size and focus of the image projected onto the material 601b.

Using this configuration, a 3D model 650 begins as only one thin layer of material covering a platform 605 at the bottom of the pressure chamber 601a. The LSM 610 selectively cures this surface through the glass on the top of the pressure chamber 601a. As soon as a current layer is partially solidified, a calculated amount of new material 601b is being injected into the pressure chamber 601a thus forming a new layer of material 601b above the newly formed one.

Due to the high pressure inside the pressure chamber 601a, the newly deposited material 601b spreads evenly without any meniscus, hills or voids across the 3D model 650 being formed within the pressure chamber 601a. The LSM 610 moves up the distance equal to the thickness of the newly formed layer to maintain its position at the focal distance 611 above the top of the material 601b. The process repeats until the entire 3D model 650 is formed within the pressure chamber 601a. The pressure within the pressure chamber 601a may be reduced to allow the lid 603 to be removed and the 3D model 610 may be taken from the pressure vessel 601 for finishing. Any remaining unused material 601*b* may be removed and a new 3D model 650 may be fabricated as described above.

FIG. 6*b* shows a second embodiment of a pressure-based material delivery and fabrication system according to the present invention. The pressure vessel 601 is utilized to form a 3D model 650 within the vessel 601 in a similar process disclosed above with a few modification. The pressure vessel 601, the lid, the transparent glass insert 604, the pressure inlet 604, and LSM 610 are present in this embodiment. The platform 605 is located on a plunger 607 that can travel up and down raising and lowering the 3D model 650 within the material 601*b*. The pressure within the pressure chamber 601*a* maintains the material 601*b* in the bottom of the pressure vessel 601 as above.

However, instead of injecting new material 601*b* into the pressure vessel 601, the plunger 607 moved the platform 605 up and down to keep the top surface of the 3D model 650 located just below the surface of the material 601*b*. The LSK 610 is moved accordingly to maintain the focal distance 611 as needed.

At the beginning of the process, the platform 605 located in an UP position, one layer below the material 601*b* surface. The LSM 610 selectively cures this surface through the glass 604 within the lid 603 of the pressure vessel 601. As soon as current layer is partially solidified, the plunger 607 moves platform 605 one layer down. The 3D model 650 being formed is pulled into the unsolidified material 601*b*. Due to the high pressure inside the pressure chamber 601*a*, the material 601*b* spreads evenly without any meniscus, hills or voids across the top of the 3D model 605. The process repeats until the entire 3D model is formed.

Once again, pressure within the pressure chamber 601*a* may be reduced to allow the lid 603 to be removed and the 3D model 610 may be taken from the pressure vessel 601 for finishing. Any additional material 601*b* needed to fabricate another 3D model may be added, the platform 605 once again raised to the UP position, and a new 3D model 650 may be fabricated as described above.

Figure 7:
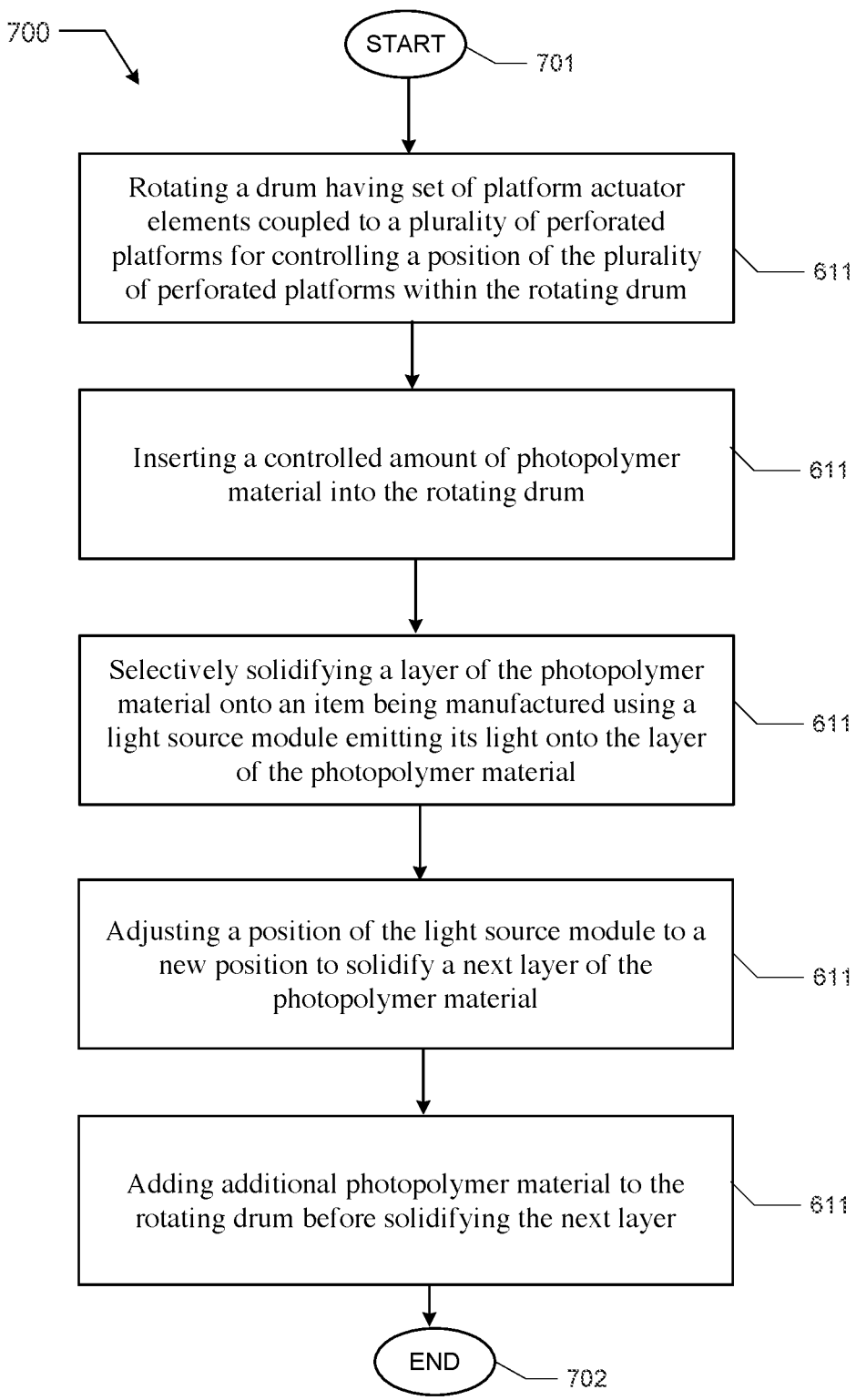
FIG. 7 illustrates a method and algorithm for providing a centrifuge-based additive object manufacturing according to the present invention.

FIG. 7 illustrates a method and algorithm for providing a centrifuge-based additive object manufacturing according to the present invention. The process 700 begins 701, and in step 711, a drum having set of platform actuator elements coupled to a plurality of perforated platforms for controlling a position of the plurality of perforated is rotated. Next, a controlled amount of photopolymer material is inserted in step 712 into the rotating drum.

A layer of the photopolymer material is selectively solidified onto an item being manufactured using a light source module emitting its light onto the layer of the photopolymer material in step 713. Next in step 714, a position of the light source module is adjusted to a new position to solidify a next layer of the photopolymer material.

Process 700 ends 702 after step 715 adds additional photopolymer material to the rotating drum before solidifying the next layer.

Figure 8:
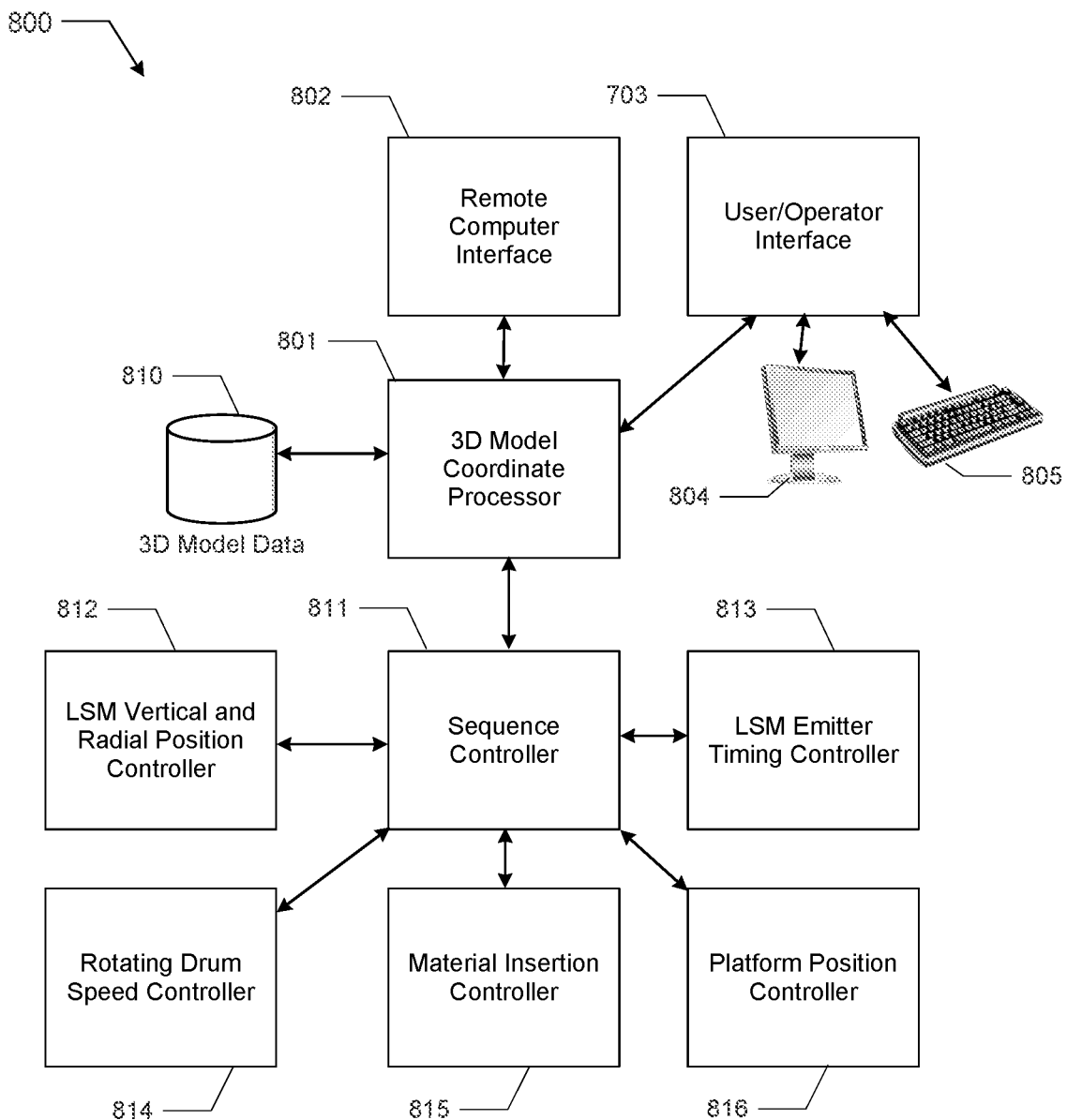
FIG. 8 illustrates software components within an example embodiment for a computer-based control system utilized within centrifuge-based additive object manufacturing according to the present invention.

FIG. 8 illustrates software components within an example embodiment for a computer-based control system utilized within centrifuge-based additive object manufacturing according to the present invention. The processing system 800 comprises a set of controller modules that perform various functions of the operation of the 3D object manufacturing system 100. These processing modules include a 3D module coordinate processor 801, remote computer interface 802, a user/operator interface 803, a sequence controller 811, an LSM vertical and radial position controller 812, an LSM emitter timing coordinator 813, a rotating drum speed controller 814, a material insertion module 815, and a platform position controller 816.

These controllers are electrically coupled to various motor drivers being used within the 3D object manufacturing system 100. These controllers are also electrically connected to various sensors that provide position, speed, pressure, and all other control values used within the 3D object manufacturing system 100 to read all the sensors, rotate drum 101, and provide all the linear motions commands as well as modulating emitters in the light source module 103 and/or sending images to a light projecting unit in case of pressurized chamber.

The 3D module coordinate processor 801 includes a Job File Generator is created to convert a 3D representation of the model(s) that need to be printed into the set of instructions for the various mechanisms of the printer (emitters, projector, motors, nozzles etc.) to be performed sequentially in order to produce a printed model. These various instructions are sent to the sequence controller 811 for submission to the individual function modules 812-816.

The remote computer interface 802 provides a communications channel to one or more computing systems to receive a 3D representation of the models that need to be printed. The most common 3D file format in 3D printing is an STL format, where the entire model is represented as a triangular mash. However, many other file formats for 3D models exist and may be used. These 3D representation of the models are typically generated in other computing systems and transferred to the 3D object manufacturing system 100 for printing. These communications channels may include wireless and wired networking connections such as Wi-Fi, cellular 3G LTE, 5G and the like, wired ethernet, fiber optic networks, and any similar communications channel. These channels may also include direct computer to computer connections such as USB, serial connections, Bluetooth connections, and similar mechanisms to exchange data between two connection computers.

The user/operator interface 803 includes a graphical user interface (GUI) to assist the operator to make an initial setup, load job files. start and stop the printing process, and all related command and control operations needed by the 3D object manufacturing system 100. The user/operator interface 803 also permits the initiation of data transfer and 3D model specifications to be downloaded from remote sources. The user/operator may receive data from the system 100 via a computer display 804 and provide inputs using a keyboard 805 or similar device. The display 804 and keyboard 805 may be combined into a touch screen device in various embodiments.

The sequence controller 811 receives the set of instructions for the various mechanisms of the printer (i.e. emitters, projector, motors, nozzles etc.) to be performed sequentially in order to produce a printed model. The sequence controller 811 passes the appropriate instructions to each of to the individual function modules 812-816. When the printing of the 3D model is occurring, the sequence controller 811 provides timing and coordinating instructions to the to the individual function modules 812-816 in the proper order to perform the tasks for each step in the printing process.

The LSM vertical and radial position controller 812 measures and manipulates the position of the light source module 103 as needed during each step in the printing process. For each iteration of a printing operation as described above with reference to the various disclosed embodiments, the light source module 103 provides light onto various parts of a product made 109 to solidify material 105 into the 3d object. In order to illuminate material 105 at desired locations and not at other locations, the light source module 103 is moved to various positions to align its emitters with the locations to be solidified. The LSM vertical and radial position controller 812 receives instructions from the sequence controller 811, maintains a current position of the light source module 103, and instructs the light source module 103 to move to various locations as needed. Once performed, the LSM vertical and radial position controller 812 receives a command for the next iteration and the process repeats until the product made 109 is complete.

The LSM emitter timing coordinator 813 activates the emitters within the light source module 103 when they are directed at a desired location. For embodiments using a rotating drum 103, the LSM emitter timing coordinator 813 obtains rotating drum speed from rotating drum speed controller 814 as well as its rotational position (which is typically specified when the rotating drum 101 as a designated point on its circumference passes a fixed spatial coordinate that that is passed once every revolution of the drum). With this data, the LSM emitter timing coordinator 813 may determine when in the time of a rotation of the drum emitters are to be activated to illuminate desired locations. The LSM emitter timing coordinator 813 receives instructions from the sequence controller 811, maintains a current position of the light source module 103, and instructs the light source module 103 activate its emitters as needed. Once performed, the LSM emitter timing coordinator 813 receives a command for the next iteration and the process repeats until the product made 109 is complete.

The rotating drum speed controller 814 commands a motor that spins the rotating drum 103 to move in the various steps of the 3D printing operations disclosed herein. The rotating drum speed controller 814 actively maintains a measurement of the current rotational speed of the rotating drum for used in determining is position as it rotates. The rotating drum speed controller 814 receives instructions from the sequence controller 811, maintains a rotational speed of the rotating drum 101, and instructs its motor to change speed as needed as needed. Once performed, the rotating drum speed controller 814 receives a command for the next iteration and the process repeats until the product made 109 is complete.

The material insertion module 815 receives instructions from the sequence controller 811, maintains the material 105 in the chamber at a desired level, and instructs its system to add or more remove material 105. The material insertion module 815 controls the material insertion nozzles and/or the pressure level within a closed chamber to control the level of the material 105 as needed. Once performed, the material insertion module 815 receives a command for the next iteration and the process repeats until the product made 109 is complete.

The platform position controller 816 controls the position of a platform within the pressurized chamber or a rotating drum 101 that raises and lowers the product made 109 throughout the entire printing process. The platform position controller 816 may also raise a completed 3d object out of the chamber when completed. The platform position controller 816 controls the height or position of a base platform within a closed chamber to control the level of the product made 109 as needed. Once performed, the platform position controller 816 receives a command for the next iteration and the process repeats until the product made 109 is complete.

Figure 9:
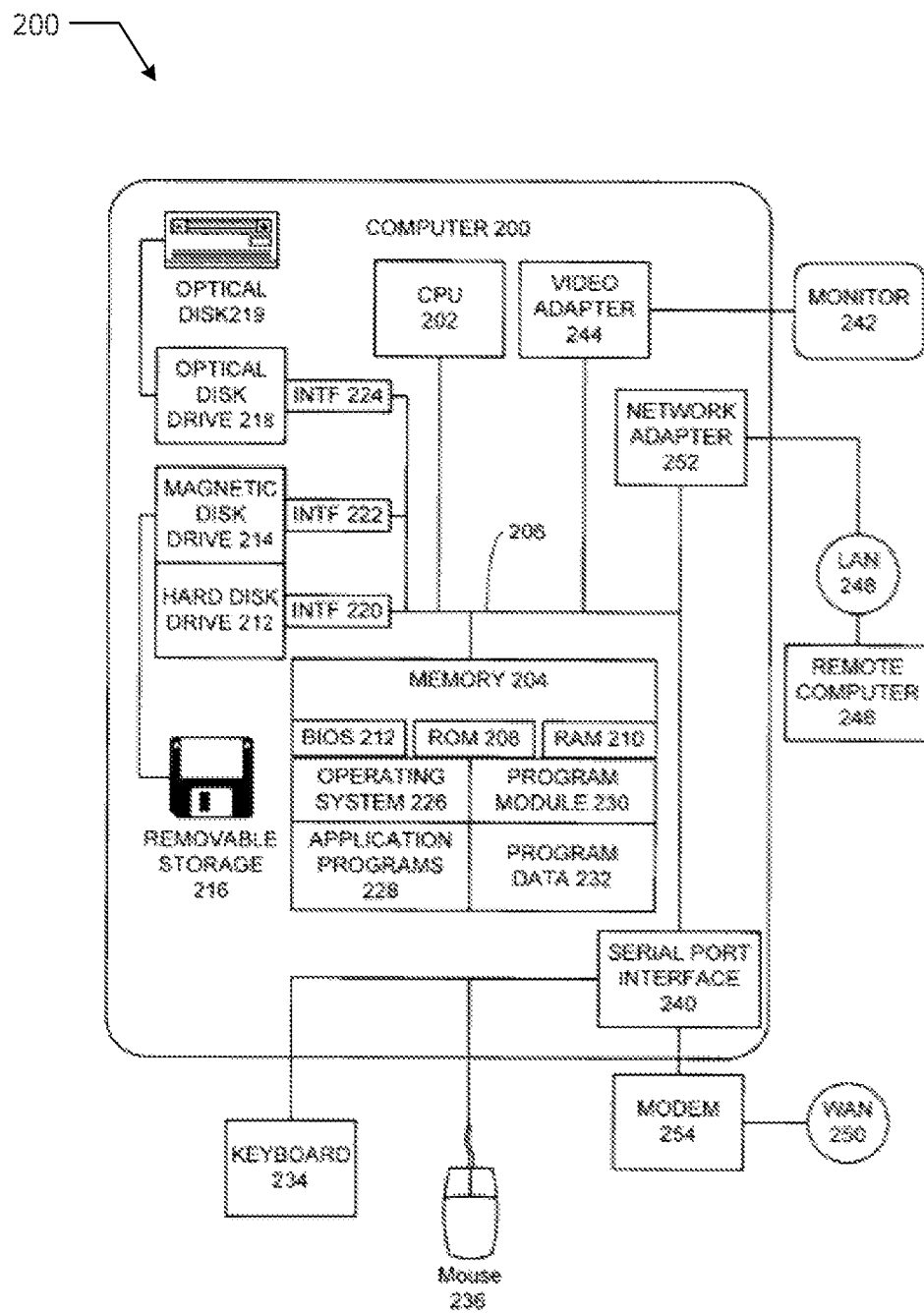
FIG. 9 illustrates a generalized schematic of a programmable processing system utilized as the various computing components described herein used to implement an embodiment of the present invention.

FIG. 9 illustrates a generalized schematic of a programmable processing system utilized as the various computing components described herein used to implement an embodiment of the present invention.

The central processing unit ("CPU") 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RANI (SDRAM), or the like. The computer system 200 may utilize RAM 208 to store the various data structures used by a software application. The computer system 200 also may include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 also may include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing device that may be adapted to perform the functions of the centrifuge-based additive object manufacturing as shown in FIG. 3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. A system for providing pressure-based additive object manufacturing, the system comprising:
    a pressure vessel, wherein the pressure vessel comprises an internal pressure chamber for storing a photopolymer material that solidifies when irradiated by a light source and a sealed lid comprising a transparent top surface to create the internal pressure chamber;
    a pressure inlet located near the lid on a top portion of the pressure vessel, wherein the pressure inlet is configured to pressurize an upper portion of the pressure chamber;
    a delivery port located on a bottom of the pressure vessel, wherein the delivery port is configured to introduce the photopolymer material into the pressure chamber;
    a build platform located at the bottom of the pressure chamber; and
    a light source module emitting a light capable of partially solidifying the photopolymer material through the transparent top surface of the lid of the pressure vessel to form a top layer of an object currently being manufactured;
    wherein the light source module selectively emits its light solidifying the top layer below a current level of the photopolymer material above the top layer, and
    wherein the pressure within the upper portion of the pressure chamber is configured to force the material to remain in a lower portion of the pressure chamber.

2. The system according to claim 1, wherein the light source module emits a different light pattern for each layer of the object currently being manufactured to solidify the photopolymer material according to the different light pattern.

3. The system according to claim 2, wherein the system further comprises a photopolymer material delivery system for adding a controlled amount of the photopolymer material into the pressure vessel through the delivery port.

4. The system according to claim 1, wherein the pressure vessel has an air pressure that is raised above surrounding atmospheric air pressure while the pressure vessel is in operation to manufacture the object.

5. A method for providing pressure-based additive object manufacturing, the method comprising the steps of:
    inserting an amount of photopolymer material into a pressure chamber via a material delivery system, the photopolymer material inserted via a delivery port located on a bottom of the pressure chamber;
    increasing air pressure within an upper portion of the pressure chamber relative to outside air pressure, thereby forcing the photopolymer material to a lower portion of the pressure chamber and evenly spreading the photopolymer material across a build platform arranged at the bottom of the pressure chamber;
    adjusting a light source module to a first desired position above the photopolymer material;
    emitting light via the light source module onto the material to partially solidify the photopolymer material into a first layer of an object;
    inserting an additional amount of photopolymer material into the pressure chamber via the delivery port;
    adjusting the light source module in a second desired position above the additional amount of photopolymer material, wherein a distance between the first desired position and the second desired position is equal to a thickness of the first layer; and
    emitting light via the light source module onto the additional amount of material to solidify the additional amount of material into a second layer of the object.

6. The method of claim 5, wherein the method further comprises:
- inserting a further amount of the additional material into the pressure chamber;
- adjusting the light source module in a third desired position above the further amount of the additional material, wherein a distance between the second desired position and the third desired position is equal to a thickness of the second layer; and
- emitting light via the light source module onto the further amount of the additional material to solidify the further amount of the additional material into a third layer of the object.

7. The method of claim 5, wherein the method further comprises repeating the inserting the additional material, adjusting the light source module, and emitting light via the light source module onto further amounts of the additional material to form a plurality of additional layers completing the object.

8. The method of claim 5, wherein the method further comprises reducing the pressure within the pressure chamber upon completion of the object, and removing the object from the pressure chamber.

* * * * *

UNITED STATES PATENT AND TRADEMARK OFFICE
CERTIFICATE OF CORRECTION

| | | |
|---|---|---|
| PATENT NO. | : 12,226,952 B2 | Page 1 of 1 |
| APPLICATION NO. | : 17/941224 | |
| DATED | : February 18, 2025 | |
| INVENTOR(S) | : Anton Zavoyskikh | |

It is certified that error appears in the above-identified patent and that said Letters Patent is hereby corrected as shown below:

On the Title Page

Item (73) - Assignee name Anton Zavoyskikh should read "Turbo 3D LLC"

Signed and Sealed this
Ninth Day of December, 2025

John A. Squires
*Director of the United States Patent and Trademark Office*